US012233517B2

(12) United States Patent
Kato

(10) Patent No.: US 12,233,517 B2
(45) Date of Patent: Feb. 25, 2025

(54) ELECTRIC WORK MACHINE

(71) Applicant: MAKITA CORPORATION, Anjo (JP)

(72) Inventor: Itsuku Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 186 days.

(21) Appl. No.: 17/982,649

(22) Filed: Nov. 8, 2022

(65) Prior Publication Data

US 2023/0144684 A1 May 11, 2023

(30) Foreign Application Priority Data

Nov. 11, 2021 (JP) ................................. 2021-184131

(51) Int. Cl.
*B25B 23/147* (2006.01)

(52) U.S. Cl.
CPC .................................. *B25B 23/147* (2013.01)

(58) Field of Classification Search
CPC ........... G05B 2219/41208; G05B 2219/41213; G05B 2219/41214; G05B 2219/41215; G05B 2219/43092; G05B 2219/43093; H02P 1/04; H02P 21/0021; H02P 23/0027; B25B 23/147
USPC ............................ 318/400.18, 568.2, 400.12
See application file for complete search history.

(56) References Cited

U.S. PATENT DOCUMENTS

2013/0049643 A1* 2/2013 Kusakawa .............. B25B 21/00 318/9
2014/0158390 A1* 6/2014 Mashiko ............... B25B 23/147 173/217
2017/0334054 A1 11/2017 Kamiya et al.

FOREIGN PATENT DOCUMENTS

JP 2016-093854 A 5/2016
JP 2017205834 A 11/2017

OTHER PUBLICATIONS

Beckert et al. (CN 108698219 B) Optimized Cutting Performance of Electronic Sliding Clutch Date Published Jul. 13, 2021 (Year: 2021).*
Hashimoto et al. (CN 112203802 A) Perforation Tool Date Published Jan. 8, 2021 (Year: 2021).*
Aran (JP H0775974 A) Power Tool With Motor Control Circuit for Increasing Effective Torque Output (Year: 1995).*
Okamura (JP 5211869 B2)Electric Motor Control Device, Offset Determination Method, and Offset Correction Method Date Published Jun. 12, 2013 (Year: 2013).*

* cited by examiner

*Primary Examiner* — Jorge L Carrasquillo
(74) *Attorney, Agent, or Firm* — Oliff PLC

(57) ABSTRACT

The electric work machine in one aspect of the present disclosure includes an output shaft, a motor, a current measuring circuit, and a controller. The current measuring circuit measures a current value, the current value corresponding to a magnitude of a drive current flowing through the motor. The controller sets a maximum value and a threshold. The controller calculates the correction value less than or equal to the maximum value so that the drive current decreases, in response to the current value having reached the threshold. The controller subtracts, from the control parameter, the correction value calculated, thereby correcting the control parameter. The controller drives the motor based on the control parameter corrected.

14 Claims, 16 Drawing Sheets

| | DRILL MODE | | CLUTCH MODE | |
|---|---|---|---|---|
| HIGH SPEED GEAR MODE | LIMIT THRESHOLD Ith | 80A | LIMIT THRESHOLD Ith | 110A |
| | PRESENCE/ABSENCE OF MAXIMUM LIMIT | PRESENT | PRESENCE/ABSENCE OF MAXIMUM LIMIT | PRESENT |
| | FIRST MAXIMUM LIMIT L_smax | 20000rpm | FIRST MAXIMUM LIMIT L_smax | 0rpm |
| | SECOND MAXIMUM LIMIT L_dmax | 50% | SECOND MAXIMUM LIMIT L_dmax | 0% |
| LOW SPEED GEAR MODE | LIMIT THRESHOLD Ith | 50A | LIMIT THRESHOLD Ith | 110A |
| | PRESENCE/ABSENCE OF MAXIMUM LIMIT | PRESENT | PRESENCE/ABSENCE OF MAXIMUM LIMIT | PRESENT |
| | FIRST MAXIMUM LIMIT L_smax | 20000rpm | FIRST MAXIMUM LIMIT L_smax | 0rpm |
| | SECOND MAXIMUM LIMIT L_dmax | 30% | SECOND MAXIMUM LIMIT L_dmax | 0% |

FIG. 6A

| | DRILL MODE | | CLUTCH MODE | |
|---|---|---|---|---|
| HIGH SPEED GEAR MODE | LIMIT THRESHOLD Ith | 80A | LIMIT THRESHOLD Ith | 110A |
| | PRESENCE/ABSENCE OF MAXIMUM LIMIT | ABSENT | PRESENCE/ABSENCE OF MAXIMUM LIMIT | PRESENT |
| | FIRST MAXIMUM LIMIT L_smax | — | FIRST MAXIMUM LIMIT L_smax | 0rpm |
| | SECOND MAXIMUM LIMIT L_dmax | — | SECOND MAXIMUM LIMIT L_dmax | 0% |
| LOW SPEED GEAR MODE | LIMIT THRESHOLD Ith | 50A | LIMIT THRESHOLD Ith | 110A |
| | PRESENCE/ABSENCE OF MAXIMUM LIMIT | PRESENT | PRESENCE/ABSENCE OF MAXIMUM LIMIT | PRESENT |
| | FIRST MAXIMUM LIMIT L_smax | 20000rpm | FIRST MAXIMUM LIMIT L_smax | 0rpm |
| | SECOND MAXIMUM LIMIT L_dmax | 30% | SECOND MAXIMUM LIMIT L_dmax | 0% |

FIG. 6B

| | DRILL MODE (FORWARD ROTATION / REVERSE ROTATION) | | CLUTCH MODE (FORWARD ROTATION / REVERSE ROTATION) | |
|---|---|---|---|---|
| HIGH SPEED GEAR MODE | LIMIT THRESHOLD Ith | 80A / 110A | LIMIT THRESHOLD Ith | 110A / 110A |
| | PRESENCE/ABSENCE OF MAXIMUM LIMIT | ABSENT / PRESENT | PRESENCE/ABSENCE OF MAXIMUM LIMIT | PRESENT / PRESENT |
| | FIRST MAXIMUM LIMIT L_smax | — / 0rpm | FIRST MAXIMUM LIMIT L_smax | 0rpm / 0rpm |
| | SECOND MAXIMUM LIMIT L_dmax | — / 0% | SECOND MAXIMUM LIMIT L_dmax | 0% / 0% |
| LOW SPEED GEAR MODE | LIMIT THRESHOLD Ith | 50A / 110A | LIMIT THRESHOLD Ith | 110A / 110A |
| | PRESENCE/ABSENCE OF MAXIMUM LIMIT | PRESENT / PRESENT | PRESENCE/ABSENCE OF MAXIMUM LIMIT | PRESENT / PRESENT |
| | FIRST MAXIMUM LIMIT L_smax | 20000rpm / 0rpm | FIRST MAXIMUM LIMIT L_smax | 0rpm / 0rpm |
| | SECOND MAXIMUM LIMIT L_dmax | 30% / 0% | SECOND MAXIMUM LIMIT L_dmax | 0% / 0% |

FIG. 6C

| | DRILL MODE | | CLUTCH MODE | |
|---|---|---|---|---|
| TRIGGER PULLED DISTANCE | DESIRED ROTATIONAL SPEED | MAXIMUM DUTY RATIO | DESIRED ROTATIONAL SPEED | MAXIMUM DUTY RATIO |
| Lv0 | 0 | 0% | 0 | 0% |
| Lv1 | 2000 | 40% | 2000 | 40% |
| Lv2 | 3000 | 40% | 3000 | 40% |
| Lv3 | 5000 | 40% | 5000 | 40% |
| Lv4 | 7000 | 40% | 7000 | 40% |
| Lv5 | 10000 | 40% | 10000 | 40% |
| Lv6 | 13000 | 50% | 13000 | 50% |
| Lv7 | 16000 | 65% | 16000 | 65% |
| Lv8 | 20000 | 80% | 20000 | 80% |
| Lv9 | 24000 | 100% | 23000 | 100% |
| Lv10 | 28000 | 100% | 26000 | 100% |

FIG. 8

| DESIRED ROTATIONAL SPEED | REFERENCE DUTY RATIO |
|---|---|
| 2000 | 5% |
| 4000 | 10% |
| 6000 | 15% |
| 8000 | 20% |
| 10000 | 26% |
| 12000 | 32% |
| 14000 | 38% |
| 16000 | 44% |
| 18000 | 52% |
| 20000 | 60% |
| 22000 | 70% |
| 24000 | 80% |
| 26000 | 90% |
| 28000 | 100% |
| 30000 | 100% |

FIG. 9

DESIRED DUTY RATIO

| TRIGGER PULLED DSITANCE | DRILL MODE | CLUTCH MODE |
|---|---|---|
| Lv0 | 0% | 0% |
| Lv1 | 5% | 5% |
| Lv2 | 8% | 8% |
| Lv3 | 12% | 12% |
| Lv4 | 16% | 16% |
| Lv5 | 22% | 22% |
| Lv6 | 30% | 30% |
| Lv7 | 42% | 42% |
| Lv8 | 60% | 60% |
| Lv9 | 80% | 75% |
| Lv10 | 100% | 90% |

FIG. 13

ELECTRIC WORK MACHINE

CROSS-REFERENCE TO RELATED APPLICATIONS

This application claims the benefit of Japanese patent application No. 2021-184131 filed with the Japan Patent Office on Nov. 11, 2021, and the entire disclosure of which is incorporated herein by reference.

BACKGROUND

The present disclosure relates to an electric work machine.

Japanese Unexamined Patent Application No. 2016-93854 discloses an electric apparatus in which a control parameter is corrected to reduce a drive current of a motor when the drive current of the motor exceeds a preset current threshold. Thus, the above described electric apparatus avoids the stop of the motor while inhibiting the drive current when the motor receives a momentary large load.

SUMMARY

The above-described electric apparatus continues to inhibit the drive current when the motor continuously receives a relatively large load. As a result, with an insufficient output torque, it may be impossible to continue to work with the electric apparatus.

In one aspect of the present disclosure, it is preferable to achieve an excellent convenience of the electric work machine.

The electric work machine in one aspect of the present disclosure includes an output shaft, a motor, a current measuring circuit, and a controller. The output shaft is attached to or is connected to a tool. The motor drives the output shaft. The current measuring circuit measures a current value. The current value corresponds to a magnitude of a drive current flowing through the motor. The controller sets a maximum value and a threshold. The controller calculates the correction value less than or equal to the maximum value so that the drive current decreases, in response to the current value having reached the threshold. The controller subtracts the calculated correction value from the control parameter, thereby correcting the control parameter. The controller drives the motor based on the corrected control parameter.

In the above-described electric work machine, the maximum value of the correction value is set, and the correction value less than or equal to the maximum value is calculated. Then, based on the calculated correction value, the control parameter is corrected. Therefore, when the motor momentarily receives a very large load, it is possible to continue to drive the motor while inhibiting the drive current. Furthermore, when the motor continuously receives a relatively large load, it is possible to avoid the drive current from being continuously inhibited and to increase the drive current as necessary. Thus, it is possible to achieve the excellent convenience of the electric work machine.

BRIEF DESCRIPTION OF THE DRAWINGS

Some embodiments of the present disclosure will be described hereinafter by way of example with reference to the accompanying drawings, in which:

FIG. 6A is one example of a table showing a limit threshold, presence or absence of a maximum limit, a first maximum limit, and a second maximum limit in a drill mode, a clutch mode, a high speed gear mode, and a low speed gear mode according to the first embodiment;

FIG. 6B is another example of a table showing the limit threshold, the presence or absence of the maximum limit, the first maximum limit, and the second maximum limit in the drill mode, the clutch mode, the high speed gear mode, and the low speed gear mode according to the first embodiment;

FIG. 6C is another example of a table showing the limit threshold, the presence or absence of the maximum limit, the first maximum limit, and the second maximum limit in the drill mode, the clutch mode, the high speed gear mode, and the low speed gear mode according to the first embodiment;

FIG. 8 is a map showing a maximum duty ratio and a desired rotational speed associated with a trigger pulled distance in the drill mode and the clutch mode according to the first embodiment;

FIG. 9 is a map showing a reference duty ratio associated with the desired rotational speed according to the first embodiment:

FIG. 13 is a map showing a desired duty ratio associated with a trigger pulled distance in a drill mode and a clutch mode according to the second embodiment.

DETAILED DESCRIPTION OF EXEMPLARY EMBODIMENTS

Overview of Embodiments

Figure 1:
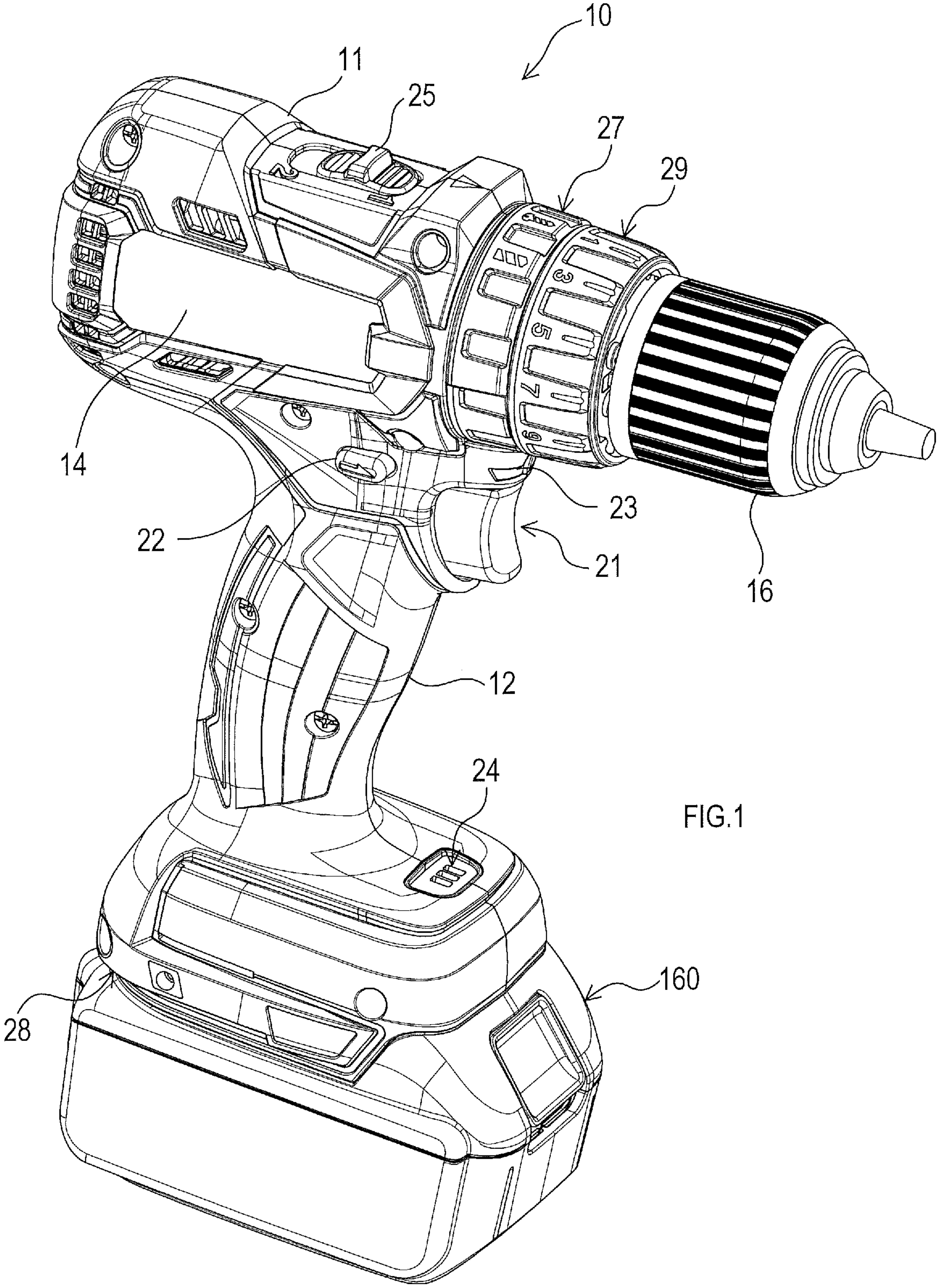
FIG. 1 shows an outer appearance of an electric work machine according to a first embodiment.

In one embodiment, an electric work machine may include a tool, an output shaft, a motor, a current measuring circuit and/or a controller. The output shaft may be attached to or be connected to a tool. The motor may drive the output shaft. The current measuring circuit may measure a current value, the current value corresponding to a magnitude of a drive current flowing through the motor. The controller may set a maximum value and a threshold. The controller may calculate the correction value less than or equal to the maximum value so that the drive current decreases, in response to the current value having reached the threshold. The controller may subtract the calculated correction value from the control parameter, thereby correcting the control parameter. The controller may drive the motor based on the corrected control parameter.

The controller may calculate a variation based on a first difference and a first gain. The controller may integrate the variation calculated, thereby calculating a correction value. The first difference may correspond to a value obtained by subtracting the threshold from the current value measured by the current measurement circuit. In the electric work machine in one embodiment, any of these features may be deleted.

When the electric work machine in one embodiment includes all the above-described features, the controller can momentarily inhibit the drive current by calculating the variation based on the first difference and the first gain. Especially, the controller multiplies the first difference by the first gain to calculate the variation, thereby making it possible to momentarily inhibit the drive current in response to the motor momentarily receiving a very large load.

The controller also integrate the variation to calculate the correction value, making it possible to continuously inhibit the drive current when the motor continuously receives a relatively large load. Furthermore, the controller also limits the correction value, thereby making it possible to increase the drive current when a torque is insufficient due to the inhibition of the drive current. Thus, the controller can inhibit the torque from being insufficient in the electric work machine.

The control parameter may include a rotational speed of the motor, a voltage applied to the motor, or a duty ratio of a pulse voltage applied to the motor. The controller corrects the rotational speed of the motor, the applied voltage, or the duty ratio, thereby making it possible to inhibit the drive current.

The electric work machine in one embodiment may further include a mode selector. The mode selector may be manually operated by a user of the electric work machine to select a first mode or a second mode. The controller may (i) change the maximum value and (ii) the controller may drive the motor, depending on the first mode or the second mode selected by the user through the mode selector.

It is possible to achieve the excellent convenience of the electric work machine by changing the maximum value depending on the first mode or the second mode.

The mode selector may be furthermore manually operated by the user to select a third mode. The controller may allow the correction value to exceed the maximum value in response to the third mode being selected by the user through the mode selector.

This allows the controller to continuously inhibit the drive current when the motor continuously receives a relatively large load in the third mode.

The first mode may be a drill mode to drill a hole in a workpiece. The second mode may be a clutch mode to fasten a screw. The controller may set a first value for the first mode, and set a second value distinct from the first value for the second mode. The first value may be a maximum value corresponding to the drill mode. The second value may be a maximum value corresponding to the clutch mode.

The magnitude of a load received by the motor in the drill mode is different from the magnitude of a load received by the motor in the clutch mode. By differentiating the first value from the second value, it is possible to achieve a more excellent convenience of the electric work machine.

The controller may make the first value larger than the second value. The magnitude of the load received by the motor in the drill mode is larger than the magnitude of the load received by the motor in the clutch mode. Thus, by making the first value larger than the second value, the controller can suitably inhibit the momentary large drive current in the drill mode.

The controller may set a third value for the first mode, and set a fourth value distinct from the third value for the second mode. The third value may be a threshold corresponding to the drill mode. The fourth value may be a threshold corresponding to the clutch mode.

By differentiating the third value from the fourth value, it is possible to achieve a more excellent convenience of the electric work machine.

The controller may make the third value smaller than the fourth value. By making the third value smaller than the fourth value, in the drill mode, a difference between the drive current and the third value increases and the correction value promptly reaches the maximum value. This allows the controller, in the drill mode, to promptly increase the drive current as necessary after limiting an output.

The electric work machine in one embodiment may further include two or more gears, and/or a deceleration ratio setter. The two or more gears may transmit the rotation of the motor to the output shaft at a first deceleration ratio or a second deceleration ratio. The second deceleration ratio may be larger than the first deceleration ratio. The deceleration ratio setter may be manually operated by the user of the electric work machine, thereby being set at the first deceleration ratio or the second deceleration ratio. The controller may set a fifth value for the first deceleration ratio, and set a sixth value distinct from the fifth value for the second deceleration ratio. The fifth value may be a maximum value corresponding to the first deceleration ratio. The sixth value may be a maximum value corresponding to the second deceleration ratio.

When the electric work machine in one embodiment further includes the two or more gears, and the deceleration ratio setter, it is possible to achieve the more excellent convenience of the electric work machine by differentiating the fifth value from the sixth value.

The controller may make the fifth value larger than the sixth value.

The controller makes the fifth value larger than the sixth value, thereby making it possible to suitably inhibit the momentary large drive current when the first deceleration ratio is set.

The controller may set a seventh value for the first deceleration ratio, and set an eighth value distinct from the seventh value for the second deceleration ratio. The seventh value may be a threshold corresponding to the first deceleration ratio. The eighth value may be a threshold corresponding to the second deceleration ratio.

By differentiating the seventh value from the eighth value, it is possible to achieve the excellent convenience of the electric work machine.

The controller may make the seventh value larger than the eighth value.

The controller makes the seventh value larger than the eighth value, thereby making it possible to promptly increase the drive current as necessary after limiting the output when the first deceleration ratio is set.

A method for controlling a motor of an electric work machine, the method including:

measuring a current value, the current value corresponding to a magnitude of a drive current flowing through the motor;

setting a maximum value and a threshold;

calculating the correction value less than or equal to the maximum value so that the drive current decreases, in response to the current value having reached the threshold;

subtracting the correction value calculated from the control parameter; and driving the motor based on the control parameter from which the correction value is subtracted.

The implementation of the above method makes it possible to achieve the same effects as those of the electric work machine described above.

In one embodiment, the above-described features may be combined in any way. In one embodiment, any of the above-described feature may be deleted.

1. First Embodiment

1-1. Configuration

Figure 2:
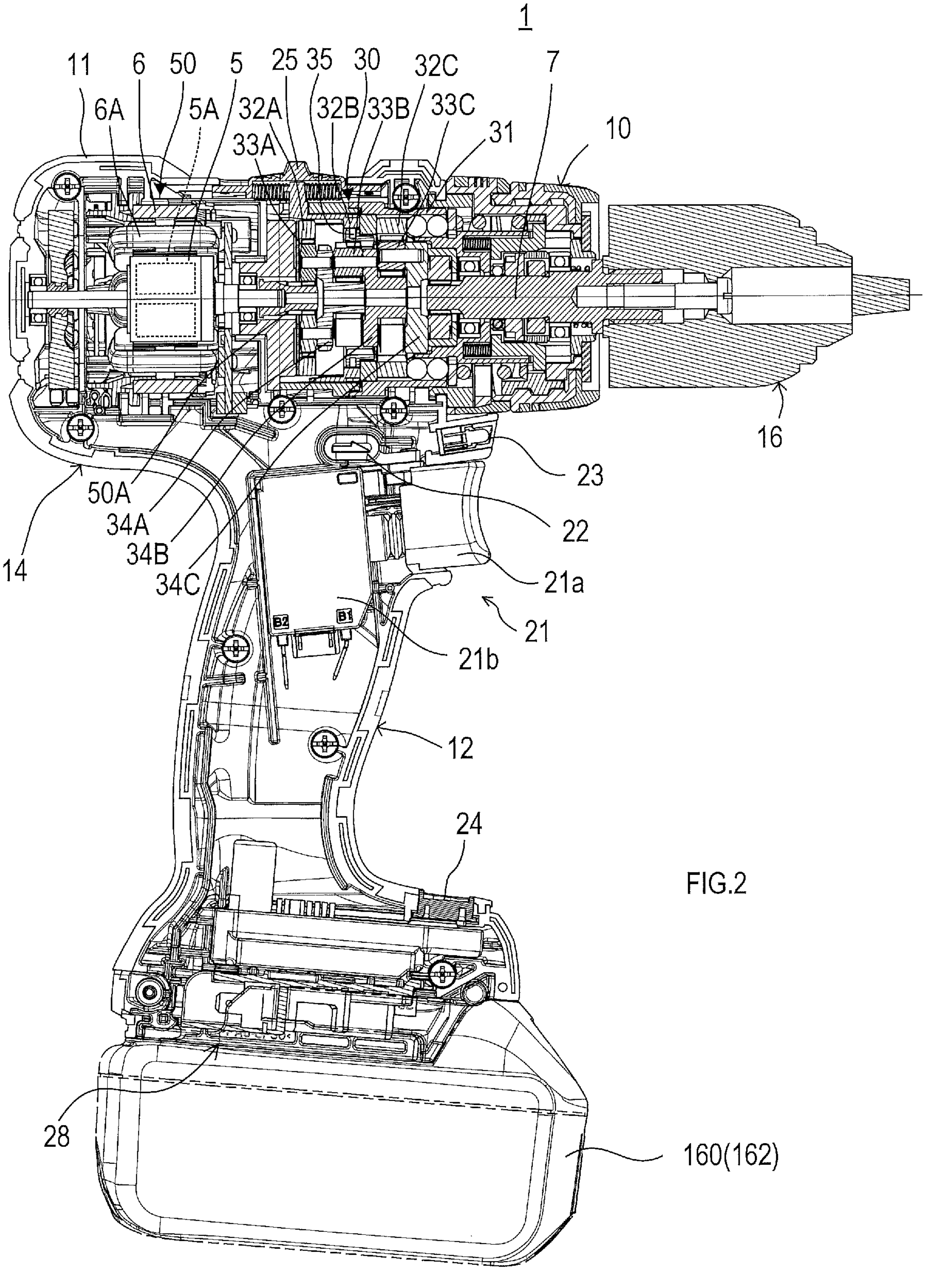
FIG. 2 shows a sectional view showing an internal configuration of the electric work machine according to the first embodiment.

Hereinafter, the mechanical configuration of an electric work machine 10 of this embodiment is described with reference to FIG. 1 and FIG. 2. In this embodiment, the electric work machine 10 is a driver drill.

The electric work machine 10 includes a housing 11. The housing 11 stores various components therein. The housing 11 includes a motor container 14. The motor container 14 is provided in a rear part of the housing 11 (on the left of the figures).

The motor container 14 stores a motor 50. The motor 50 is a three-phase brushless motor. The housing 11 stores a gear case 31 in front of the motor container 14. The gear case 31 stores a deceleration mechanism 30. The deceleration mechanism 30 has an output shaft 7. Details about the deceleration mechanism 30 will be described below. In this embodiment, the deceleration mechanism 30 is one example of the two or more gears of the present disclosure.

The electric work machine 10 includes a chuck portion 16. The chuck portion 16 is arranged to protrude from a leading end of the housing 11 (on the right of the figures). In the chuck portion 16, a tool bit (or a tool) 80 is attached to the output shaft 7.

The electric work machine 10 includes a torque selector 29. The torque selector 29 is arranged in a rear part of the chuck portion 16. The torque selector 29 is a rotatable annular member. The torque selector 29 is rotated by the user to set a magnitude of a torque (i.e. a tightening force) selected by the user. In a below-described clutch mode, the electric work machine 10 outputs a torque having the selected magnitude.

The electric work machine 10 includes a mode selector 27. The mode selector 27 is arranged behind the torque selector 29. The mode selector 27 is a rotatable annular member. The mode selector 27 is rotated by the user to set one of the operation modes selected by the user. In this embodiment, the operation modes include a drill mode and a clutch mode. The drill mode is an operation mode to drill a hole in a workpiece. The clutch mode is an operation mode to fasten a screw. In a case where the clutch mode is selected, a clutch is disengaged in response to an output torque reaching the magnitude selected through the torque selector 29. As a result, the electric work machine 10 does not output a torque having a magnitude more than or equal to the selected magnitude.

The electric work machine 10 includes a grip 12 to be held by the user. The grip 12 downwardly protrudes from the housing 11. The grip 12 includes a trigger 21. The trigger 21 includes a trigger switch 21*a* to be pulled by the user holding the grip 12. The trigger 21 includes a speed setter 21*b* including a slide resistor.

The electric work machine 10 includes a forward/reverse changeover switch 22. The forward/reverse changeover switch 22 is arranged above the trigger 21 and at the bottom of the housing 11. The forward/reverse changeover switch 22 is operated by the user to switch a rotation direction of the motor 50 in a forward direction or a reverse direction. Note that the operation modes may include a forward direction rotation mode and a reverse direction rotation mode. In the forward direction rotation mode, the motor 50 rotates in the forward direction. In the reverse direction rotation mode, the motor 50 rotates in the reverse direction.

The electric work machine 10 includes a light 23. The light 23 is arranged above the trigger 21 and at the bottom of the housing 11. The light 23 includes one or more light emitting diodes (hereinafter, LEDs). In response to the user pulling the trigger switch 21*a*, the light 23 shines on an area in front of the electric work machine 10.

The electric work machine 10 includes a sliding connector 28 provided on the under surface of the bottom of the grip 12. To the connector 28, a battery pack 160 is connected by sliding over the connector 28.

The battery pack 160 includes a battery 162 having a specified voltage. The battery 162 is a rechargeable battery that is repeatedly rechargeable, such as a lithium-ion battery.

On the top surface of the bottom part of the grip 12, a remaining capacity indicator 24 is arranged. The remaining capacity indicator 24 includes one or more LEDs and indicates a remaining capacity of the battery 162.

Next, details of the deceleration mechanism 30*a* is described with reference to FIG. 2. The deceleration mechanism 30 includes internal gears 32A, 32B, 32C, planetary gears 33A, planetary gears 33B, and planetary gears 33C. The internal gears 32A, 32B, 32C are fixed to the inner peripheral surface of the gear case 31. The planetary gears 33A revolve in the internal gear 32A. The planetary gears 33B revolve in the internal gear 32B. The planetary gears 33C revolve in the internal gear 32C.

The internal gears 32A, 32B, 32C are arranged in this order along a rotation axis direction of the motor 50 from the motor 50 to the leading end of the housing 11. Similarly, the planetary gears 33A, the planetary gears 33B, the planetary gears 33C are arranged in this order along the rotation axis direction of the motor 50 from the motor 50 to the leading end of the housing 11. The planetary gears 33A are arranged around the rotation axis at specified angular intervals. The planetary gears 33B are arranged around the rotation axis at specified angular intervals. The planetary gears 33C are arranged around the rotation axis at specified angular intervals.

The deceleration mechanism 30 includes carriers 34A, 34B, 34C. The carriers 34A, 34B, 34C are arranged in this order along the rotation axis direction of the motor 50 and rotatable around the rotation axis of the motor 50. The carrier 34A is arranged between the planetary gears 33A and the planetary gears 33B. The carrier 34A rotatably supports the planetary gears 33A and is fitted to the planetary gears 33B. The carrier 34B is arranged between the planetary gears 33B and the planetary gears 33C, and rotatably supports the planetary gears 33B, and is fitted to the planetary gears 33C. The carrier 34C is arranged on the leading end side relative to the planetary gears 33C, and rotatably supports the planetary gears 33C.

The planetary gears 33A are fitted to a pinion gear 50A fixed to the rotation axis of the motor 50. To the carrier 34C, the output shaft 7 is fixed.

The rotation of the motor 50 is decelerated in three stages by the planetary gears 33A-33C and the carriers 34A-34C and then transmitted to the output shaft 7.

The deceleration mechanism 30 includes a slide ring 35. The slide ring 35 is movable in the gear case 31 along the rotation axis direction of the motor 50. The internal gear 32B is fixed to the slide ring 35.

The slide ring 35 is physically connected to a gear operator 25. The gear operator 25 is provided on the top surface of the housing 11. In response to the user moving the gear operator 25 in a front-rear direction, the slide ring 35 moves along the rotation axis direction of the motor 50.

In response to the user operating the gear operator 25 to move the slide ring 35 from a front end position to a rear end position, the planetary gears 33B are connected to the carrier 34A by the internal gear 32B. This allows the carrier 34A to rotate together with the carrier 34B. As a result, the deceleration mechanism 30 decelerates the rotation of the motor 50 in two stages by the planetary gears 33A, 33C and the carriers 34A, 34C, and then, transmits it to the output shaft 7.

Thus, in response to the user moving the gear operator 25 backward, the rotation of the motor 50 is decelerated at a first reduction ratio (i.e. in two stages), whereby the output shaft 7 rotates at a high speed. In response to the user moving the gear operator 25 forward, the rotation of the motor 50 is decelerated at a second reduction ratio (i.e. in three stages), whereby the output shaft 7 rotates at a low speed. The second deceleration ratio is larger than the first deceleration ratio. Hereinafter, a mode in which the first deceleration ratio is selected by the user is referred to as a high speed gear mode, and a mode in which the second deceleration ratio is selected by the user is referred to as a low speed gear mode. In this embodiment, the gear operator 25 is one example of the deceleration ratio setter of the present disclosure.

The use can change the speed as appropriate by operating the gear operator 25. In a low speed rotation, in which the rotation of the motor 50 is decelerated in three stages, a torque corresponding to the drive current increases compared to a case of a high-speed rotation, in which the rotation of the motor 50 is decelerated in two stages. In one embodiment, at least one of the internal gears 32A, 32B, 32C, the planetary gears 33A, the planetary gears 33B, the planetary gears 33C, the carriers 34A, 34B, 34C, and the slide ring 35 may be excluded.

Figure 3:
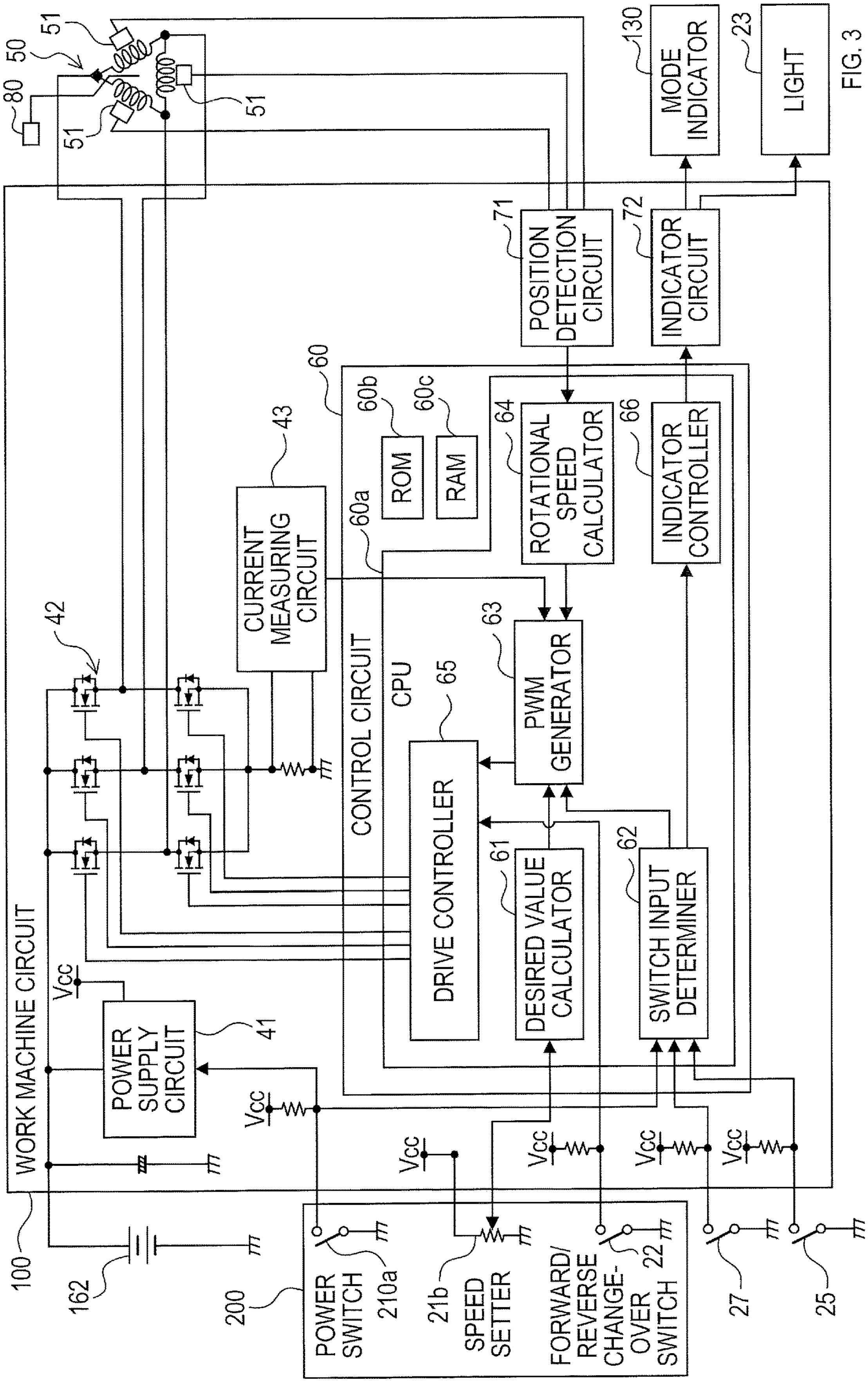
FIG. 3 is a block diagram showing an electrical configuration of the electric work machine according to the first embodiment.

Next, the electric configuration of the electric work machine 10 is described with reference to FIG. 3.

The electric work machine 10 includes a position sensor 51. The position sensor 51 includes three Hall ICs. The three Hall ICs are arranged to correspond to three-phase stators of the motor 50. Each time the rotor of the motor 50 rotates by a predetermined angle, the Hall IC outputs a rotation detection signal to a below-described position detection circuit 71.

The electric work machine 10 includes a switch unit 200. The switch unit 200 includes a power switch 210*a*. In response to a pulled distance of the trigger switch 21*a* being more than or equal to a specified distance, the power switch 210*a* outputs a power-on signal to a below-described power supply circuit 41 and a switch input determiner 62. In response to the pulled distance of the trigger switch 21*a* being less than the specified distance, the power switch 210*a* outputs a power-off signal to the power supply circuit 41 and the switch input determiner 62.

The switch unit 200 includes the speed setter 21*b*. The speed setter 21*b* includes the slide resistor and outputs a resistance value corresponding to the pulled distance of the operation part 21*a* to a desired value calculator 61.

The switch unit 200 includes the forward/reverse changeover switch 22. In a case where the rotation direction is switched to the forward direction, the forward/reverse changeover switch 22 outputs a forward direction signal to a below-described drive controller 65. In a case where the rotation direction is switched to a reverse direction, the forward/reverse changeover switch 22 outputs a reverse direction signal to the drive controller 65.

To the switch input determiner 62, a mode selector 27 outputs an operation mode signal corresponding to the selected operation mode (specifically, the drill mode or the clutch mode). The gear operator 25 outputs a gear mode signal corresponding to the selected gear mode to the switch input determiner 62.

The electric work machine 10 includes a work machine circuit 100. The work machine circuit 100 includes the power supply circuit 41. The power supply circuit 41 is connected to the battery 162. The power supply circuit 41 generates a specified power supply voltage Vcc from an input power in response to the receipt of the power-on signal. The power supply circuit 41 supplies the power supply voltage Vcc to various circuits, such as a control circuit 60 in the work machine circuit 100.

The work machine circuit 100 includes a motor driver 42. The motor driver 42 is a three-phase full-bridge circuit including three high-side switching elements and three low-side switching elements. The motor driver 42 is connected between the battery 162 and the motor 50. The motor driver 42 receives an electric power from the battery 162 to allow an electric current to flow through the winding of each phase of the motor 50. Each switching element of the motor driver 42 is turned on or off in accordance with a control command output from the below-described control circuit 60.

The work machine circuit 100 includes a current measuring circuit 43. The current measuring circuit 43 measures a value of a drive current flowing through the motor 50 and outputs a measurement signal, corresponding to the value of the measured drive current, to a PWM generator 63.

The work machine circuit 100 includes the position detection circuit 71. The position detection circuit 71 detects the rotational position of the rotor of the motor 50 based on the rotation detection signal input from the position sensor 51. The position detection circuit 71 outputs a position signal, corresponding to the detected rotational position, to the control circuit 60.

The work machine circuit 100 includes the control circuit 60. The control circuit 60 includes a CPU 60*a*, a ROM 60*b*, a RAM 60*c*, and I/O. Various functions of the control circuit 60 are realized by the CPU 60*a* executing a program stored in a non-transitory tangible storage medium. In this embodiment, the ROM 60*b* corresponds to the non-transitory tangible storage medium. By the execution of this program, a method corresponding to the program is carried out. Note that a part or all of the functions executed by the CPU 60*a* may be made up of hardware with one or more ICs. The control circuit 60 may be made up of a single microcomputer or may be made up of two or more microcomputers. In this embodiment, the control circuit 60 corresponds to one example of the controller.

The control circuit 60 includes, as various functions, the desired value calculator 61, the switch input determiner 62, the PWM generator 63, a rotational speed calculator 64, the drive controller 65 and an indicator controller 66. In this embodiment, the control circuit 60 includes all the above-described various functions; however, in one embodiment, any of the above-described various functions may be excluded.

The desired value calculator 61 calculates a desired rotational speed of the motor 50 based on an input resistance value.

The switch input determiner 62 determines whether the power source is on or off based on the input power-on signal or power-off signal, and outputs the determination result to the PWM generator 63 and the indicator controller 66. The switch input determiner 62 determines a selected operation mode based on the input operation mode signal, and outputs the determination result to the PWM generator 63 and the indicator controller 66. The switch input determiner 62 determines a selected gear mode based on the input gear mode signal, and outputs the determination result to the PWM generator 63 and the indicator controller 66.

The rotational speed calculator 64 calculates a rotational speed of the motor 50 based on the position signal input from the position detection circuit 71, and outputs the calculation result to the PWM generator 63.

The PWM generator 63 generates a PWM signal based on (i) the determination result of the power source being on/off, (ii) the determination result of the operation mode, (iii) the determination result of the gear mode, (iv) the detection signal, (v) the measurement signal, and (vi) the calculation result. The PWM generator 63 outputs the generated PWM signal to the drive controller 65.

The drive controller 65 generates a control command based on (i) the PWM signal output from the PWM generator 63 and (ii) the forward direction signal or reverse direction signal output from the forward/reverse changeover switch 22. The control command instructs each switching element of the motor driver 42 to turn on or off. The drive controller 65 outputs the generated control command to the motor driver 42. In this way, a pulsed voltage based on the PWM signal is applied to the winding of each phase of the motor 50.

The electric work machine 10 includes a mode indicator 130. The mode indicator 130 includes at least one LED. The work machine circuit 100 includes an indicator circuit 72. The indicator controller 66 causes the mode indicator 130 to notify the operation mode through the indicator circuit 72, based on the determination result of the input operation mode. That is, the indicator controller 66 causes the mode indicator 130 to turn on, blink, and turn off in accordance with the operation mode. The indicator controller 66 also causes the light 23 to turn on, blink, and turn off through the indicator circuit 72 based on (i) the determination result of the power source being on/off, (ii) the determination result of the operation mode, and (iii) the determination result of the gear mode.

1-2. Process

1-2-1. Motor Drive Process

Figure 4:
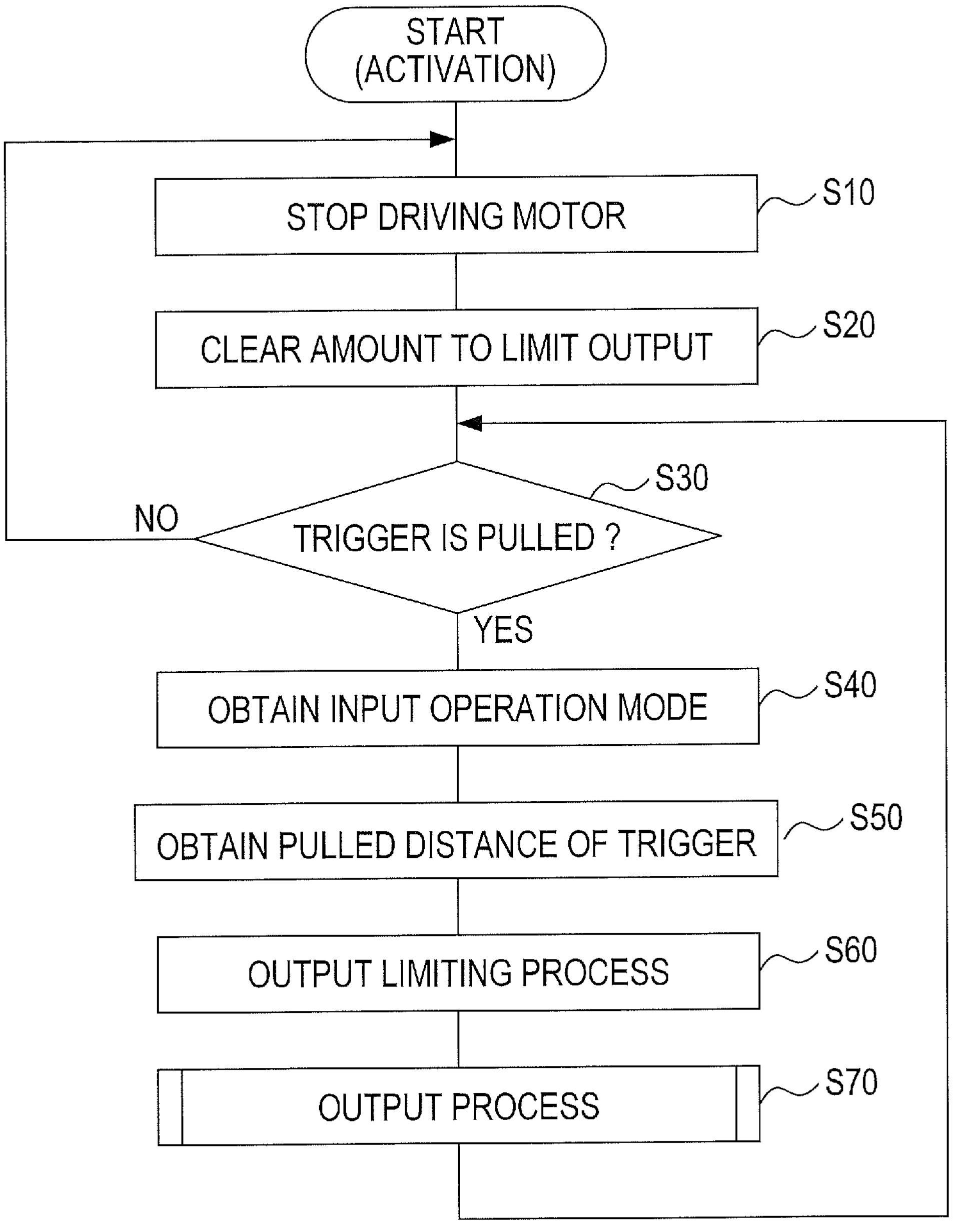
FIG. 4 is a flow chart showing a procedure of a motor drive process according to the first embodiment.

Next, a motor drive process executed by the control circuit 60 is described with reference to a flowchart of FIG. 4. In response to the power source being turned on and activated, the control circuit 60 starts this process.

First, in S10, the control circuit 60 stops driving the motor 50.

Then, in S20, the control circuit 60 clears a present amount to limit the output. That is, the control circuit 50 makes the amount to limit the output zero. The amount to limit the output includes a below-described amount to limit the rotational speed and/or an amount to limit the duty ratio.

Then, in S30, the control circuit 60 determines whether the trigger switch 21*a* is pulled by a specified distance or more. Upon the determination that the trigger switch 21*a* is pulled by the specified distance or more (S30: YES), the control circuit 60 proceeds to a process of S40. Upon the determination that the trigger switch 21*a* is not pulled by the specified distance or more (S30: NO), the control circuit 60 returns to the process of S10.

In S40, the control circuit 60 obtains the input operation mode and the input gear mode. In this embodiment, the operation mode is the drill mode or the clutch mode, and the gear mode is the high speed gear mode or the low speed gear mode. In a case where the operation mode includes a forward rotation mode and a reverse rotation mode in addition to the drill mode and the clutch mode, the operation mode obtained by the control circuit 60 includes the drill mode or the clutch mode, and the forward rotation mode or the reverse rotation mode.

Then, in S50, the control circuit 60 obtains a pulled distance of the trigger switch 21*a* based on a resistance value output from the speed setter 21*b*.

Then, In S60, the control circuit 60 executes an output limiting process, thereby limiting an output of the motor 50. This makes it possible to avoid damage to the motor 50 and/or the work machine circuit 100 due to an excessive increases in the drive current.

Then, in S70, the control circuit 60 executes an output process. That is, the control circuit 60 controls the output of the motor 50 based on the amount to limit the output calculated in the output limiting process. Details of the output process will be described below. After the process of S70, the control circuit 60 returns to the process of S30.

1-2-2. Output Limiting Process

Figure 5A:
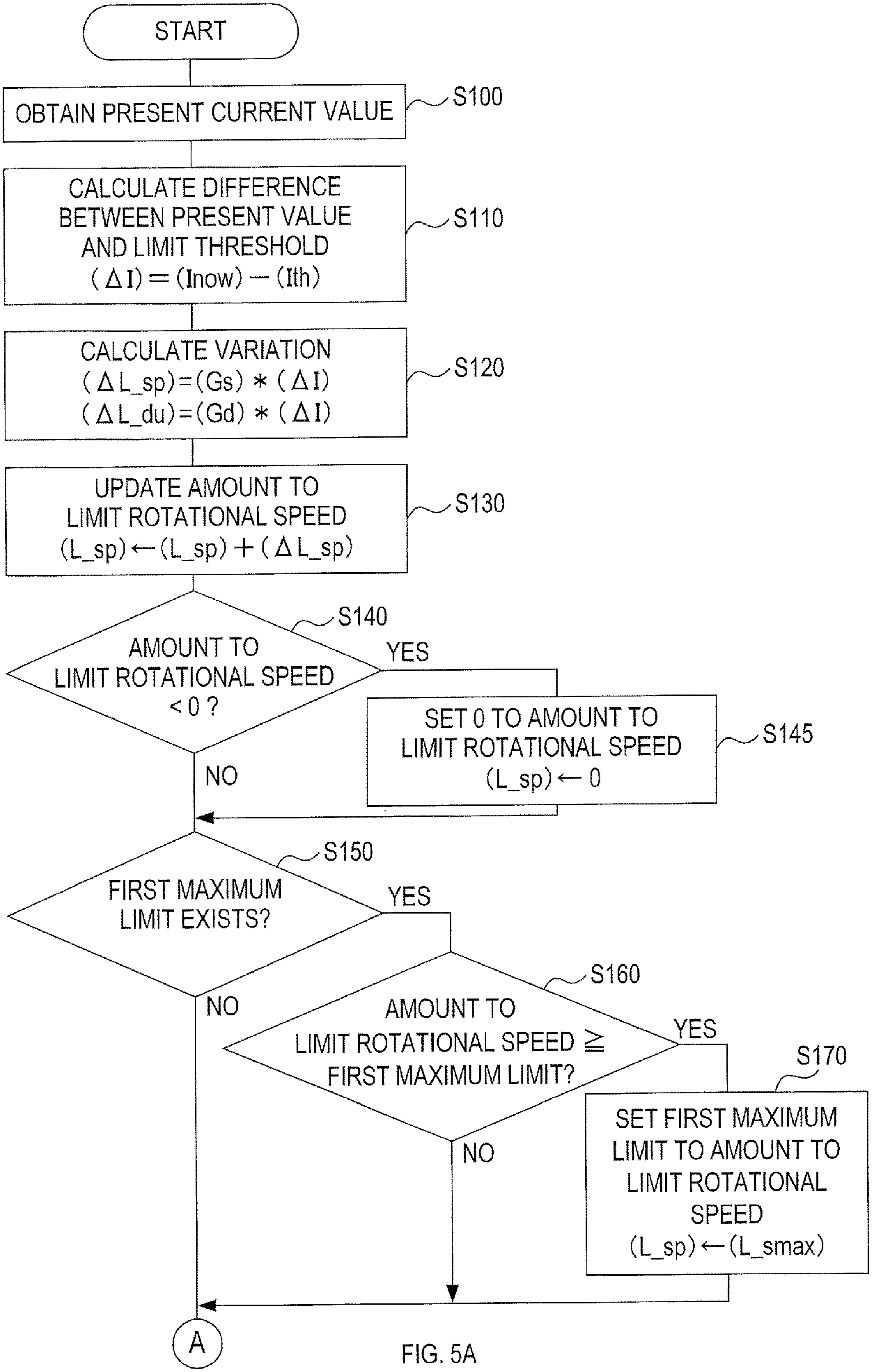
FIG. 5A is a part of a flow chart showing a procedure of an output limiting process according to the first embodiment.
Figure 5B:
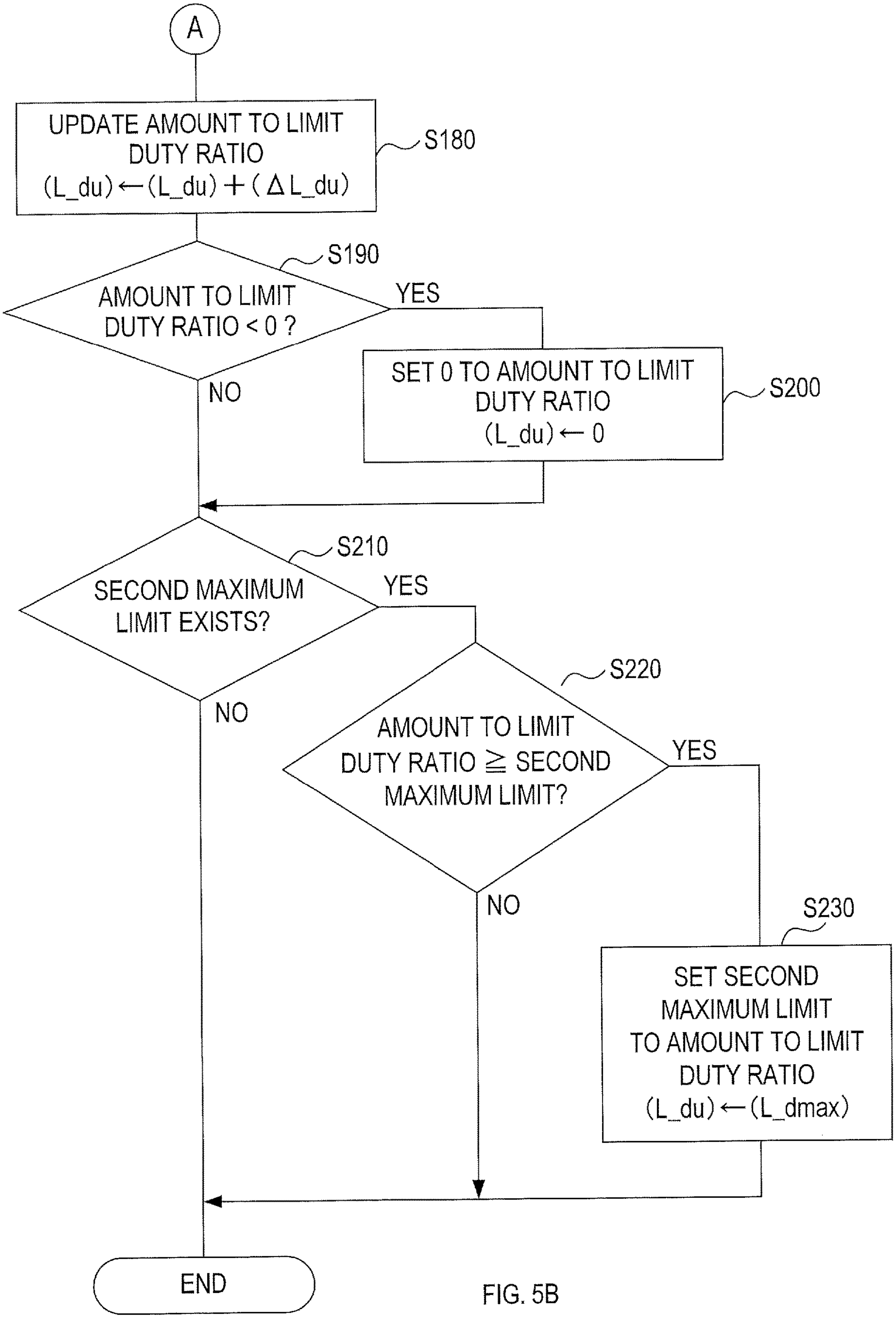
FIG. 5B is a remaining part of the flow chart showing the procedure of the output limiting process according to the first embodiment.

Next, the output limiting process executed by the control circuit 60 is described with reference to the flowcharts of FIG. 5A and FIG. 5B.

First, in S100, the control circuit 60 obtains a value of the present drive current (hereinafter, a drive current value) Inow.

Then, in S110, the control circuit 60 calculates a difference ΔI. The difference ΔI is a value obtained by subtracting a limit threshold Ith from Inow obtained in S100. The limit threshold Ith is decided in accordance with the operation mode and the gear mode, and stored in ROM 60*b*. FIG. 6A and FIG. 6B each show one example of a first map of the limit threshold Ith in (i) the drill mode, (ii) the clutch mode, (iii) the high speed gear mode and (iv) the low speed gear mode. FIG. 6A and FIG. 6B each show an example in which the operation mode does not include the forward rotation mode and the reverse rotation mode, showing four sets of various parameters decided based on a combination of the four modes (i) through (iv). FIG. 6C shows an example of the first map in which the operation mode includes the forward rotation mode and the reverse rotation mode. FIG. 6C shows eight sets of various parameters decided based on a combination of six modes (i) through (vi). The six modes (i) through (vi) include (i) the forward drill mode, (ii) the reverse drill mode, (iii) the forward clutch mode, (iv) the reverse clutch mode, (v) the high speed gear mode, and (vi) the low speed gear mode. Various parameters include (i) a limit threshold Ith, (ii) a below-described presence or absence of a maximum limit, (iii) a maximum limit of the amount to limit the rotational speed L_smax, and (iv) a maximum limit of the amount to limit the duty ratio L_dmax.

As shown in FIG. 6A and FIG. 6B, the limit thresholds Ith in the drill mode are different from the limit thresholds Ith in the clutch mode. Specifically, the limit thresholds Ith in the drill mode are smaller than the limit thresholds Ith in the clutch mode. As shown in FIG. 6C, the limit thresholds Ith in the forward drill mode is different from the limit thresholds Ith in the reverse drill mode. Specifically, the limit thresholds Ith in the forward drill mode are smaller than the limit thresholds Ith in the reverse drill mode.

As shown in FIG. 6A and FIG. 6B, the limit thresholds Ith in the drill mode in the high speed gear mode are different from the limit thresholds Ith in the drill mode in the low speed gear mode. Specifically, the limit thresholds Ith in the drill mode in the high speed gear mode are larger than the limit thresholds Ith in the drill mode in the low speed gear mode. As shown in FIG. 6C, the limit threshold Ith in the forward drill mode in the high speed gear mode is different from the limit threshold Ith in forward drill mode in the low speed gear mode. Specifically, the limit threshold Ith in the forward drill mode in the high speed gear mode is larger than the limit threshold Ith in forward drill mode in the low speed gear mode. The control circuit 60 sets the limit threshold Ith based on the operation mode, the gear mode and the first map.

Then, in S120, the control circuit 60 calculates a first variation ΔL_sp and a second variation ΔL_du. Specifically, the control circuit 60 multiplies the difference ΔI calculated in S110 by a speed gain Gs, thereby calculating the first variation ΔL_sp. The control circuit 60 also multiplies the difference ΔI by a duty gain Gd, thereby calculating the second variation ΔL_du. If the present drive current value Inow is larger than the limit threshold Ith, the first variation ΔL_sp and the second variation ΔL_du are made positive values to further limit the output. On the other hand, if the present drive current value Inow is smaller than the limit threshold Ith, the first variation ΔL_sp and the second variation ΔL_du are made negative values to ease the limitation of the output.

Then, in S130, the control circuit 60 adds the first variation ΔL_sp calculated in S120 to the present amount to limit the rotational speed L_sp, thereby updating the amount to limit the rotational speed L_sp. Thus, the amount to limit the rotational speed L_sp corresponds to an integrated value of the first variation ΔL_sp.

Then, in S140, the control circuit 60 determines whether the amount to limit the rotational speed L_sp updated in S130 is less than 0 (i.e. negative value). Upon the determination that the amount to limit the rotational speed L_sp is more than or equal to 0 (S140: NO), the control circuit 60 proceeds to S150. Upon the determination that the amount to limit the rotational speed L_sp is less than 0 (S140: YES), the control circuit 60 proceeds to S145.

In S145, the control circuit 60 sets 0 to the amount to limit the rotational speed L_sp, and proceeds to S150.

In S150, the control circuit 60 determines whether there is the maximum limit of the amount to limit the rotational speed L_smax (hereinafter, first maximum limit L_smax). The presence or absence of the first maximum limit L_smax is decided based on the operation mode and the gear mode, and stored in the ROM 60*b*. The first map of each FIG. 6A and FIG. 6B shows one example of the presence or absence of the first maximum limit L_smax in (i) the drill mode, (ii) the clutch mode, (iii) the high speed gear mode, and (iv) the low speed gear mode. The first map of FIG. 6C shows one example of the presence or absence of the first maximum limit L_smax in (i) the forward drill mode, (ii) the reverse drill mode, (iii) the forward clutch mode, (iv) the reverse clutch mode, (v) the high speed gear mode, and (vi) the low speed gear mode. In the example shown in FIG. 6A, all the combinations of the modes (i) through (iv) include the first maximum limits L_smax. On the other hand, in the example shown in FIG. 6B, a combination of the drill mode and the high speed gear mode does not include the first maximum limit L_smax, and other combinations include the first maximum limits L_smax. In the example shown in FIG. 6C, a combination of the forward drill mode and the high speed gear mode does not include the first maximum limit L_smax, and other combinations include the first maximum limits L_smax. The presence or absence of the first maximum limit L_smax is decided based of the operation mode and the gear mode, and a type of electric work machine 10 as well. FIG. 6A shows a decided example for a first-type electric work machine 10. FIG. 6B shows a decided example for a second-type electric work machine 10. FIG. 6C shows a decided example for a third-type electric work machine 10. In the example shown in FIG. 6B, the drill mode corresponds to one example of the third mode of the present disclosure. In the example shown in FIG. 6C, the forward drill mode corresponds to one example of the third mode of the present disclosure.

In S150, upon the determination that there is the first maximum limit L_smax (S150: YES), the control circuit 60 proceeds to S160. Upon the determination that there is not the first maximum limit L_smax (S150: NO), the control circuit 60 proceeds to a process of S180.

In S160, the control circuit 60 determines where the amount to limit the rotational speed L_sp updated in S130 is more than or equal to the first maximum limit L_smax. The first maximum limit L_smax is decided in accordance with the operation mode and the gear mode, and stored in the ROM 60*b*. The first map of each FIG. 6A and FIG. 6B shows one example of the first maximum limit L_smax in (i) the drill mode, (ii) the clutch mode, (iii) the high speed gear mode, and (iv) the low speed gear mode. The first map of FIG. 6C shows one example of the first maximum limit L_smax in (i) the forward drill mode, (ii) the reverse drill mode, (iii) the forward clutch mode, (iv) the reverse clutch mode, (v) the high speed gear mode, and (vi) the low speed gear mode.

As shown in FIGS. 6A and 6B, the first maximum limits L_smax in the drill mode are different from the first maximum limits L_smax in the clutch mode. Specifically, the first maximum limits L_smax in the drill mode are larger than the first maximum limits L_smax in the clutch mode. As shown in FIG. 6C, the first maximum limits L_smax in the forward drill mode are different from the first maximum limits L_smax in the reverse drill mode. Specifically, the first maximum limits L_smax in the forward drill mode are larger than the first maximum limits L_smax in the reverse drill mode. The control circuit 60 sets the first maximum limit L_smax based on the operation mode, the gear mode and the first map.

In S160, upon the determination that the amount to limit the rotational speed L_sp is more than or equal to the first maximum limit L_smax (S160: YES), the control circuit 60 proceeds to a process of S170.

In S170, the control circuit 60 sets the first maximum limit L_smax to the amount to limit the rotational speed L_sp. Therefore, even if the drive current Inow is continuously larger than the limit threshold Ith, once the amount to limit the rotational speed L_sp reaches the first maximum limit L_smax, the amount to limit the rotational speed L_sp does not increase any further.

Thus, when the motor 50 momentarily receives a very large load, the control circuit 60 can inhibit a momentary increase in the drive current. When the motor 50 continuously receives a relatively large load, the control circuit 60 can increase the drive current as necessary.

For example, in a case where the user drills a hole in wood with the electric work machine 10, the motor 50 momentarily receives a very large load when the tool bit hits a knot in the wood. As a result, the control circuit 60 limits the output of the electric work machine 10. When the user continues drilling and the hole gets deeper, the motor 50 continuously receives a relatively large load. This relatively large load is smaller than the load when the tool bit hits a knot. If the control circuit 50 continues to limit the drive current of the motor 50, the electric work machine 10 cannot output a necessary torque, and the work by the electric work machine 10 stops. In contrast, the amount to limit the rotational speed L_sp is set to be less than or equal to the first maximum limit L_smax, whereby the control circuit 60 increases the drive current of the motor 50 as necessary. Therefore, the stop of the work by the electric work machine 10 can be avoided. The control circuit 60 proceeds to a process of S180 after the process of S170.

On the other hand, in S160, upon the determination that the amount to limit the rotational speed L_sp is less than the first maximum limit L_smax (S160: NO), the control circuit 60 proceeds to S180.

In S180, the control circuit 60 adds the second variation ΔL_du calculated in S120 to the amount to limit the duty ratio L_du, thereby updating the amount to limit the duty ratio L_du. Therefore, the amount to limit the duty ratio L_du corresponds to an integrated value of the second variation ΔL_du.

Then, in S190, the control circuit 60 determines whether the amount to limit the duty ratio L_du updated in S180 is less than 0 (i.e. negative value). Upon the determination that the amount to limit the duty ratio L_du is more than or equal to 0 (S190: NO), the control circuit 60 proceeds to a process of S210. Upon the determination that the amount to limit the duty ratio L_du is less than 0 (S190: YES), the control circuit 60 proceeds to a process of S200.

In S200, the control circuit 60 sets 0 to the amount to limit the duty ratio L_du and proceeds to a process of S210.

In S210, the control circuit 60 determines whether there is the maximum limit of the amount to limit the duty ratio L_dmax (hereinafter, second maximum limit L_dmax). As in the case of the presence or absence of the first maximum limit L_dmax, the presence or absence of the second maximum limit L_dmax is decided based on the operation mode and the gear mode, and is stored in the ROM 60*b*. In this embodiment, as shown in FIGS. 6A, 6B, and 6C, the presence or absence of the second maximum limit L_dmax corresponds to the presence or absence of the first maximum limit L_smax. However, the presence or absence of the second maximum limit L_dmax may be decided independently of the presence or absence of the first maximum limit L_dmax.

In S210, upon the determination that there is the second maximum limit L_dmax (S210: YES), the control circuit 60 proceeds to a process of S220. Upon the determination that there is not the second maximum limit L_dmax (S210: NO), the control circuit 60 ends this process.

In S220, the control circuit 60 determines whether the amount to limit the duty ratio L_du updated in S180 is more than or equal to the second maximum limit Ldmax. The second maximum limit L_dmax is decided based on the operation mode and the gear mode, and stored in the ROM 60*b*. FIG. 6A and FIG. 6B each show one example of the first map of the second maximum limit L_dmax in (i) the drill mode, (ii) the clutch mode, (iii) the high speed gear mode, and (iv) the low speed gear mode. FIG. 6C shows one example of the first map of the second maximum limit L_dmax in (i) the forward drill mode, (ii) the reverse drill mode, (iii) the forward clutch mode, (iv) the reverse clutch mode, (v) the high speed gear mode, and (vi) the low speed gear mode.

As shown in FIGS. 6A and 6B, the second maximum limit L_dmax in the drill mode is different from the second maximum limit L_dmax in the clutch mode. Specifically, the second maximum limit L_dmax in the drill mode is larger than the second maximum limit L_dmax in the clutch mode. Also, as shown in FIG. 6C, the second maximum limit L_dmax in the forward drill mode is different from the second maximum limit L_dmax in the reverse drill mode. Specifically, the second maximum limit L_dmax in the forward drill mode is larger than the second maximum limit L_dmax in the reverse drill mode.

As shown in FIG. 6A, the second maximum limit L_dmax in the drill mode in the high speed gear mode is different from the second maximum limit L_dmax in the drill mode in the low speed gear mode. Specifically, the second maximum limit L_dmax in the drill mode in the high speed gear mode is larger than the second maximum limit L_dmax in the drill mode in the low speed gear mode.

In S220, upon the determination that the amount to limit the duty ratio L_du is more than or equal to the second maximum limit L_dmax (S220: YES), the control circuit 60 proceeds to a process of S230.

In S230, the control circuit 60 sets the second maximum limit L_dmax to the amount to limit the duty ratio L_du. Therefore, even if the drive current Inow is continuously larger than the limit threshold Ith, once the amount to limit the duty ratio L_du reaches the second maximum limit L_dmax, the amount to limit the duty ratio L_du does not increase any further. Thus, when the motor 50 momentarily receives a very large load, the control circuit 60 can inhibit a momentary increase in the drive current. When the motor 50 continuously receives a relatively large load, the control circuit 60 can increase the drive current as necessary. The control circuit 60 ends this process after the process of S230.

On the other hand, in S220, upon the determination that the amount to limit the duty ratio L_du is less than the second maximum limit L_dmax (S220: NO), the control circuit 60 ends this process.

1-2-3. Output Process

Figure 7:
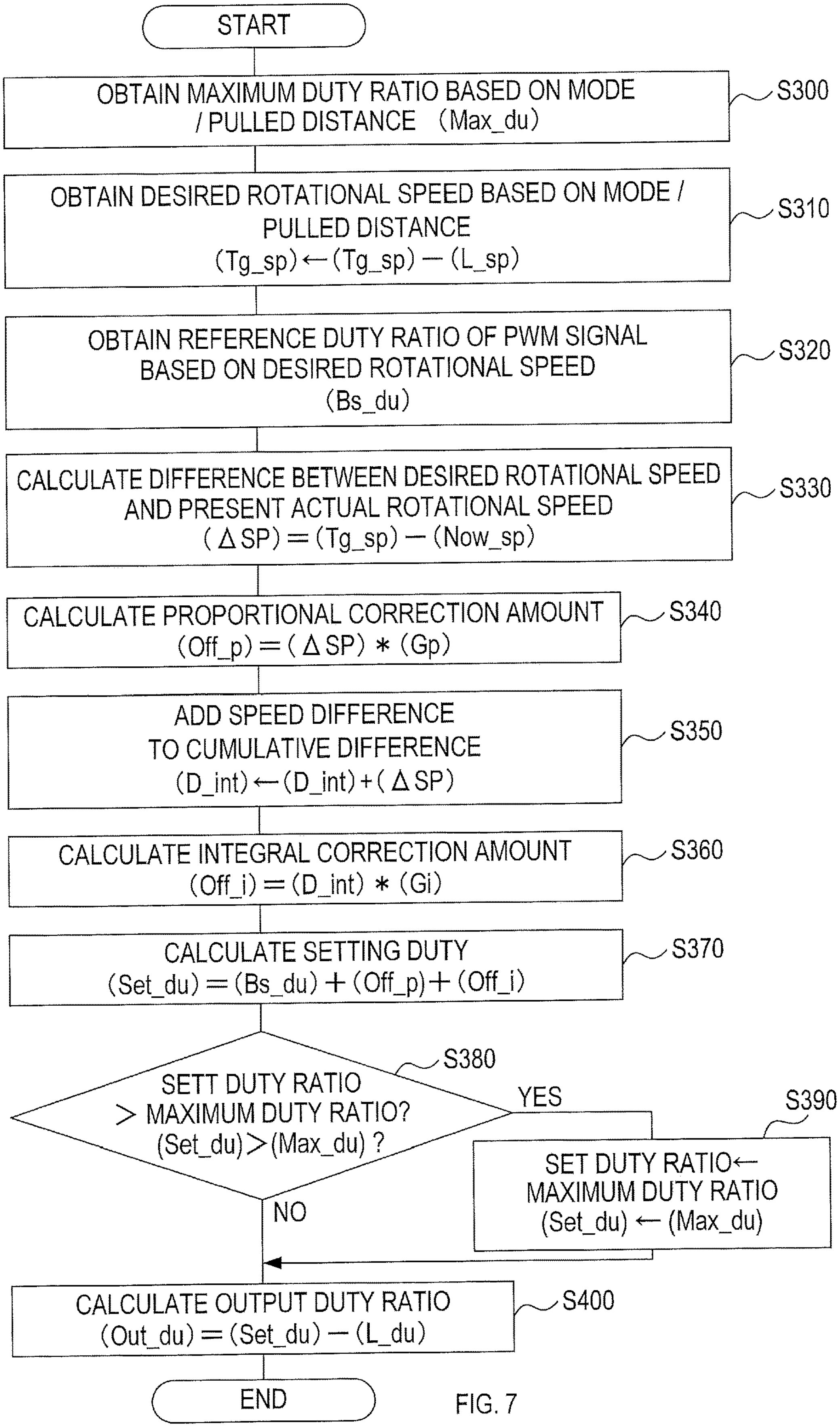
FIG. 7 is a flow chart showing a procedure of an output process according to the first embodiment.

Next, the output process executed by the control circuit 60 is described with reference to the flowchart of FIG. 7.

First, in S300, the control circuit 60 obtains a maximum duty ratio Max_du based on (i) the mode obtained in S40, (ii) the pulled distance obtained in S50, and (iii) a second map. The second map shows the maximum duty ratio Max_du associated with the trigger pulled distance in each of the drill mode and the clutch mode, and is stored in the ROM 60*b*. FIG. 8 shows one example of the second map of this embodiment.

Subsequently, in S310, the control circuit 60 obtains a desired rotational speed Tg_sp based on (i) the mode obtained in S40, (ii) the pulled distance obtained in S50, and (iii) the second map. The second map shows a desired rotational speed Tg_sp associated with the trigger pulled distance in each of the drill mode and the clutch mode, In S310, the control circuit 60 subtracts the amount to limit the rotational speed L_sp from the desired rotational speed Tg_sp obtained from the second map, thereby correcting the desired rotational speed Tg_sp. The amount to limit the rotational speed L_sp is a value calculated in the output limiting process.

Then, in S320, the control circuit 60 obtains a reference duty ratio Bs_du of the PWM signal in accordance with the corrected desired rotational speed Tg_sp obtained in S310. Specifically, the control circuit 60 obtains the reference duty ratio Bs_du based on a third map in which the desired rotational speed Tg_sp is associated with the reference duty ratio Bs_du. The third map is stored in ROM 60*b*. FIG. 9 shows one example of the third map of this embodiment.

Then, in S330 through S360, the control circuit 60 calculates a proportional correction amount Off_p and an integral correction amount Off_i to execute a feedback control of the rotational speed of the motor 50 based on the proportional-integral control. The proportional correction amount Off_p and the integral correction amount Off_i are feedback correction amounts.

First, in S330, the control circuit 60 calculates a speed difference ΔSP. The speed difference ΔSP is a value obtained by subtracting a present actual rotational speed Now_sp from the desired rotational speed Tg_sp.

Subsequently, in S340, the control circuit 60 multiplies the speed difference ΔSP calculated in S330 by a proportional gain Gp, thereby calculating the proportional correction amount Off_p.

Then, in S350, the control circuit 60 adds the speed difference ΔSP calculated in S330 to a present cumulative difference D_int, thereby updating the cumulative difference D_int.

Subsequently, in S360, the control circuit 60 multiplies the cumulative difference D_int, which was updated in S350, by an integral gain Gi, thereby calculating the integral correction amount Off_i.

Then, in S370, the control circuit 60 adds (i) the proportional correction amount Off_p calculated in S340 and (ii) the integral correction amount Off_i calculated in S360 to the reference duty ratio Bs_du obtained in S320, thereby calculating the set duty ratio Set_du.

Then, in S380, the control circuit 60 determines whether the set duty ratio Set_du calculated in S370 is larger than the maximum duty ratio Max_du obtained in S300. Upon the determination that the set duty ratio Set_du is less than or equal to the maximum duty ratio Max_du (S380: NO), the control circuit 60 proceeds to a process of S400. Upon the determination that the set duty ratio Set_du is larger than the maximum duty ratio Max_du (S380: YES), the control circuit 60 proceeds to a process of S390.

In S390, the control circuit 60 sets the maximum duty ratio Max_du to the set duty ratio Set_du. This inhibits the drive current from exceeding a protection threshold.

Then, in S400, the control circuit 60 subtracts the amount to limit the duty ratio L_du from the set duty ratio Set_du, thereby calculating the output duty ratio Out_du. The amount to limit the duty ratio L_du is a value calculated in the output limiting process. Then, the control circuit 60 generates a control command based on the output duty ratio Out_du and outputs the control command to the motor driver 42.

1-3. Operation

Figure 10:
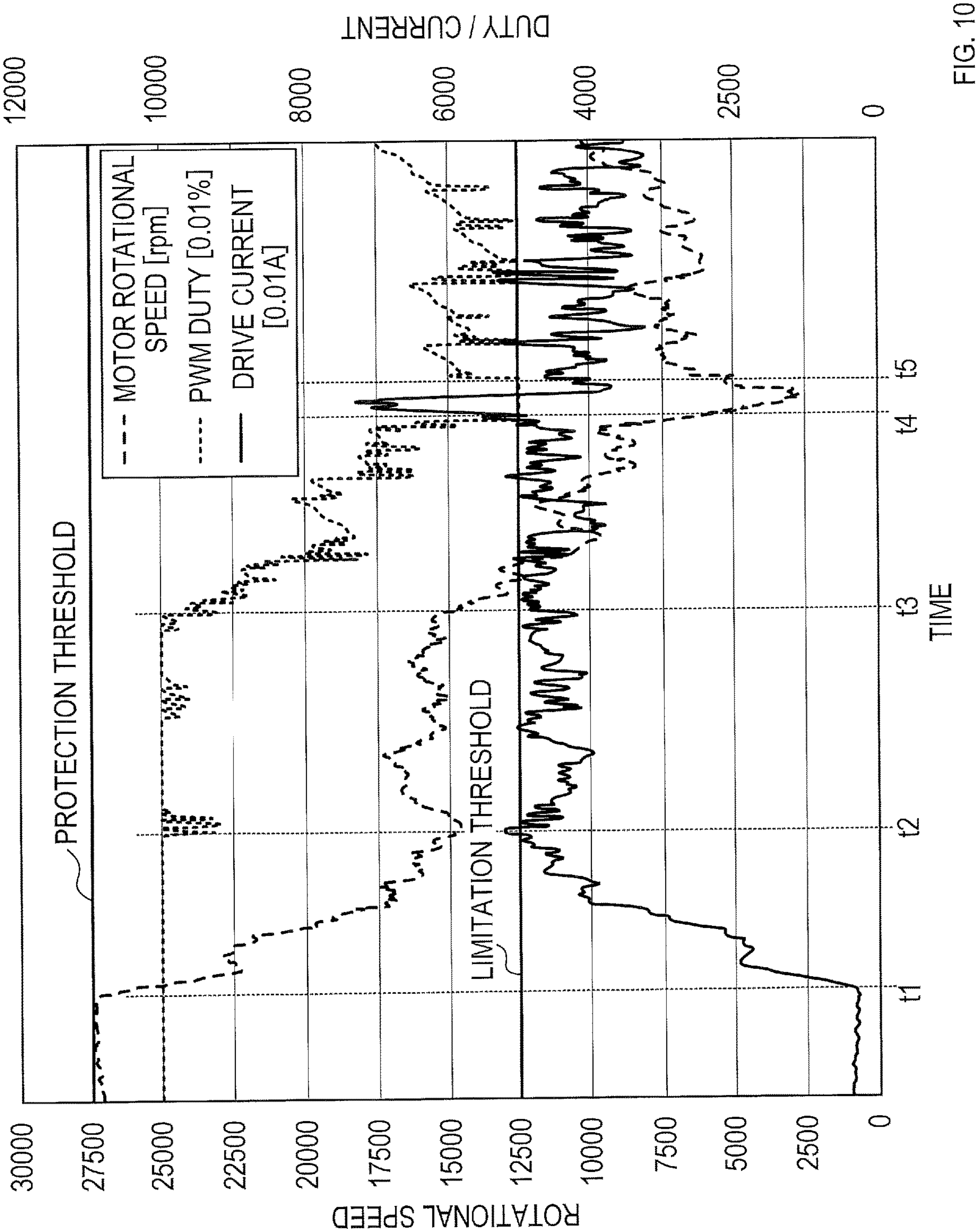
FIG. 10 is a time chart showing a time variation of a motor rotational speed, a PWM duty ratio, and the drive current according to the first embodiment.

FIG. 10 shows a time variation of the actual rotational speed of the motor 50, the duty ratio of the PWM signal, and the drive current when the control circuit 60 executes the motor drive process of this embodiment.

As shown in FIG. 10, at a time point t1, the motor 50 receives a load and the actual rotational speed begins to decrease. In response to the decrease in the actual rotational speed, the drive current begins to increase to make the actual rotational speed closer to the desired rotational speed. At a time point t2, in response to the value of the drive current exceeding the limit threshold, an output is started to be limited. As a result, the duty ratio decreases from 100%, and the drive current decreases following the decrease in the duty ratio. At a time point t3, a continuous limitation of the output is started.

At a time point t4, the motor 50 receives a very large load, and the actual rotational speed rapidly decreases, and the drive current rapidly increases. Due to this rapid increase in the drive current, the amount to limit the output increases and the duty ratio decreases to 50%, and the drive current significantly decreases. With the increase in the amount to limit the output, the amount to limit the output reaches the maximum limit. As a result, the duty ratio is constant at 50%, and is not lower than 50%.

At a time point t5, in response to the electric work machine 10 requiring a drive current larger than the limited drive current, the duty ratio increases and the drive current increases. That is, the control circuit 60 increases the drive current as necessary while inhibiting a rapid increase in the drive current.

Figure 11:
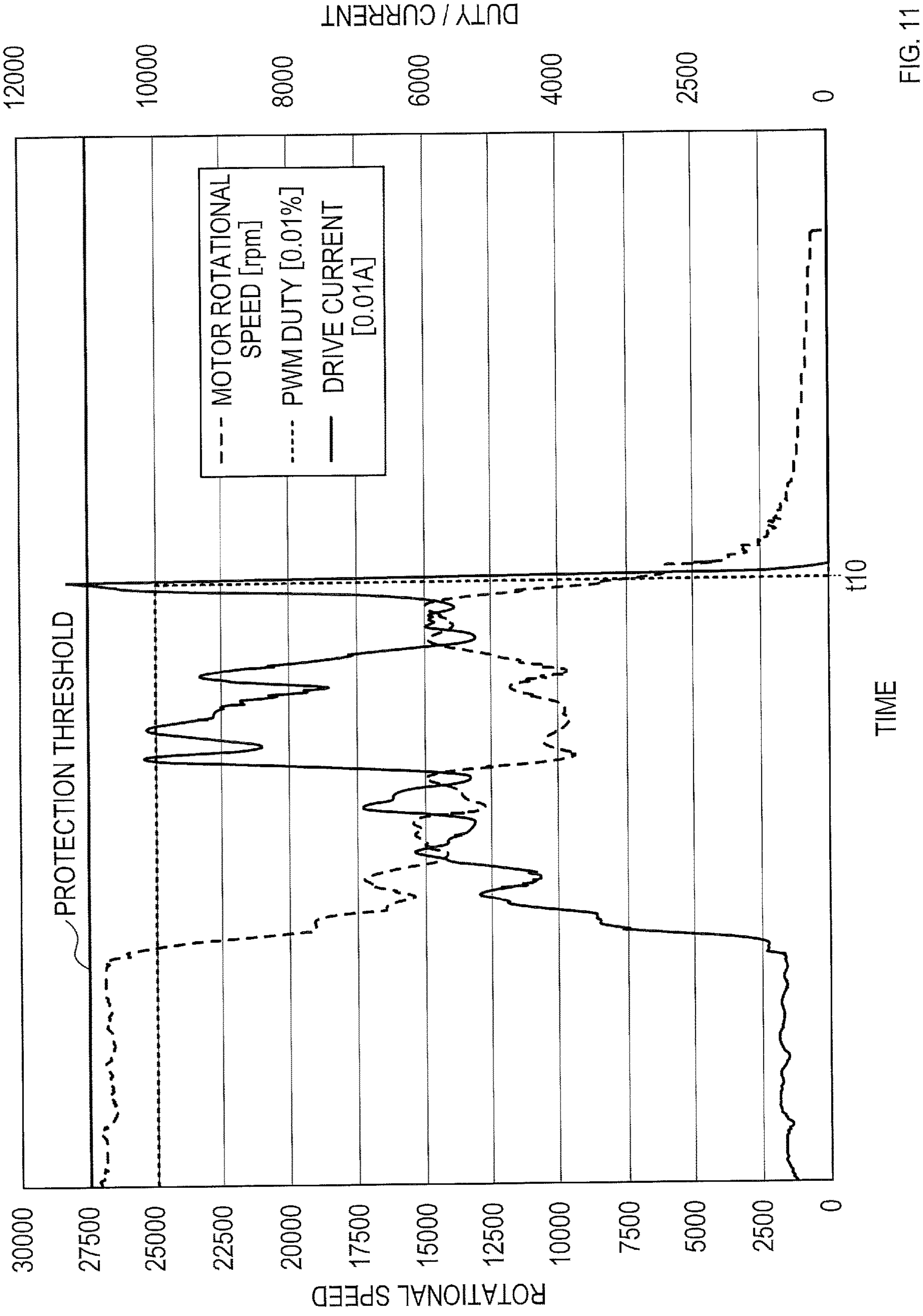
FIG. 11 is a time chart showing a time variation of a motor rotational speed, a PWM duty ratio, and a drive current according to a reference example.

As comparison with this embodiment, FIG. 11 shows a time variation of a rotational speed of a motor 50, a duty ratio of a PWM signal, and a drive current in a reference example. In the reference example, the control circuit 60 does not set the limit threshold and does not execute the output limiting process.

In FIG. 11, when the motor 50 receives a load and the actual rotational speed starts to decrease, the drive current starts to increase. At a time point t10, when a value of the drive current exceeds the protection threshold, the duty ratio rapidly decreases from 100% to 0%, and the value of the drive current becomes zero and the motor 50 stops.

1-4. Effects

In the first embodiment detailed above, the following effects can be obtained.

(1) The first and second maximum limits are set, and upon the determination that the drive current value exceeds the limit threshold, the amounts to limit the rotational speed and the duty ratio, which are less than the first and second maximum limits, are calculated. Then, based on the calculated amounts to limit the rotational speed and the duty ratio, the desired rotational speed and the output duty ratio are corrected. Therefore, when the motor 50 momentarily receives a very large load, the control circuit 60 can inhibit the drive current and continue to drive the motor 50. Furthermore, when the motor 50 continuously receives a relatively large load, the control circuit 50 can avoid the drive current from being continuously inhibited and increase the drive current as necessary.

(2) The control circuit 60 integrates the first and second variations in the limit of each of the rotational speed and the duty ratio, thereby calculating each amounts to limit the rotational speed and the duty ratio. This allows the control circuit 60 to momentarily inhibit the drive current when the motor 50 momentarily receives a very large load. The control circuit 60 can increase the drive current as necessary when the motor 50 continuously receives a relatively large load.

(3) The first and second maximum limits in the drill mode is set to be larger than the first and second maximum limits in the clutch mode. This allows the control circuit 60 to suitably inhibit the momentary large drive current in the drill mode.

(4) After drilling a hole with the electric work machine 10 in the forward drill mode, the user set the electric work machine 10 in the reverse drill mode to pull the tool bit out of the hole. Thus, in the reverse drill mode, it is assumed that a continuous load is not applied to the motor 50. Thus, in the reverse drill mode, the first and second maximum limits are set to be relatively small. This improves working efficiency.

(5) The limit threshold in the drill mode, or the forward drill mode is set to be smaller than the limit threshold in the clutch mode, or in the reverse drill mode. This increases a difference between the drive current and the limit threshold in the drill mode or the forward drill mode, and each of the amount to limit the rotational speed and the amount to limit the duty ratio quickly reaches the maximum limit. Therefore, in the drill mode or the forward drill mode, the control circuit 60 can promptly increase the drive current as necessary after limiting the output.

(6) The second maximum limit in the high speed gear mode is set to be larger than the second maximum limit in the low speed gear mode. This allows the control circuit 60 to suitably inhibit the momentary large drive current in the high speed gear mode.

(7) The limit threshold in the high speed gear mode is set to be larger than the limit threshold in the low speed gear mode. This allows the control circuit 60, in a high speed gear mode, to promptly increase the drive current as necessary after limiting the output.

(8) In the drill mode in the high speed gear mode, or in the forward drill mode in the high speed gear mode, the first and second maximum limits are not set. This allows the control circuit 60 to continuously inhibit the drive current when the motor 50 continuously receives a relatively large load in the drill mode in the high speed gear mode, or in the forward drill mode in the high speed gear mode.

2. Second Embodiment

2-1. Difference from First Embodiment

The basic configuration of a second embodiment is similar to that of the first embodiment, and thus, differences are described hereinafter. The reference numerals same as those in the first embodiment indicate the same configurations and refer to the preceding description.

In the above-described first embodiment, the control circuit 60 performed the feedback control of the rotational speed of the motor 50. In contrast, in the second embodiment, the control circuit 60 is different from the first embodiment in that the control circuit 60 controls the rotational speed of the motor 50 without feedback. That is, the second embodiment is different from the first embodiment in the output process of the motor drive process.

In the second embodiment, the control circuit 60 calculates only the amount to limit the duty ratio L_du in the output limiting process and does not need to calculate the amount to limit the rotational speed L_sp. The desired value calculator 61 calculates a desired duty ratio Tg_du based on the resistance value output from the speed setter 21*b* and a determination result of the operation mode output from the switch input determiner 62. The second embodiment does not necessarily include a function of the rotational speed calculator 64.

2-2. Output Process

Figure 12:
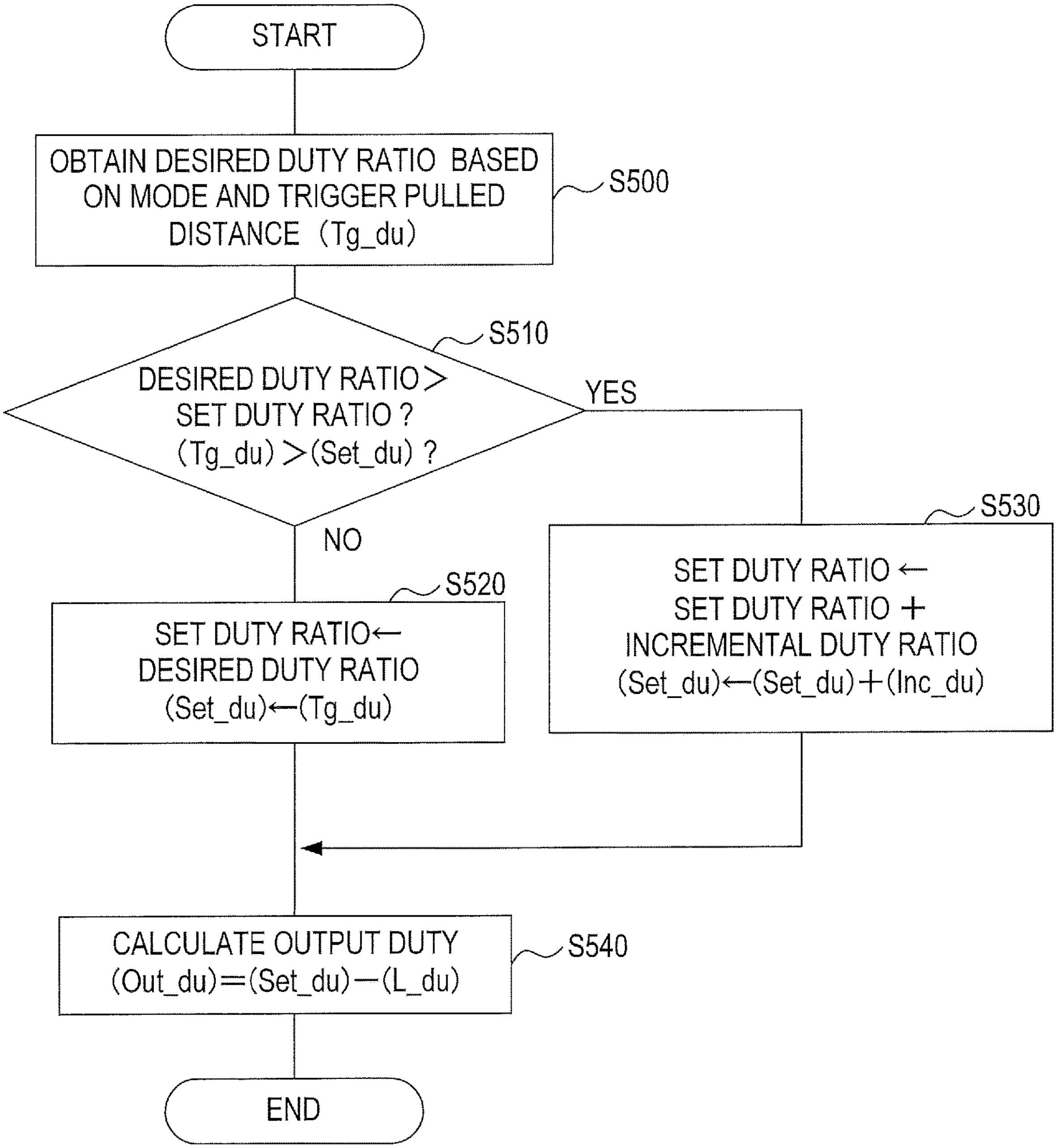
FIG. 12 is a flow chart showing a procedure of an output process according to a second embodiment.

Next, an output process executed by the control circuit 60 is described with reference to the flowchart of FIG. 12.

First, in S500, the control circuit 60 obtains a desired duty ratio Tg_du based on (i) the mode obtained in S40, (ii) the pulled distance obtained in S50, and (iii) a fourth map. The fourth map shows the desired duty ratio Tg_du associated with the trigger pulled distance in each of the drill mode and the clutch mode, and is stored in the ROM 60*b*. FIG. 13 shows one example of the fourth map of this embodiment.

Then, in S510, the control circuit 60 determines whether the desired duty ratio Tg_du obtained in S500 is larger than the presently-set set duty ratio Set_du. Upon the determination that the desired duty ratio Tg_du is less than or equal to the set duty ratio Set_du (S510: NO), the control circuit 60 proceeds to a process of S520. In S520, the control circuit 60 sets the desired duty ratio Tg_du to the set duty ratio Set_du and proceeds to a process of S540.

Upon the determination that the desired duty ratio Tg_du is larger than the set duty ratio Set_du in S510 (S510: YES), the control circuit 60 proceeds to a process of S530. In S530, the control circuit 60 adds an incremental duty ratio Inc_du to the set duty ratio Set_du, thereby updating the set duty ratio Set_du and proceeds to a process of S540. The incremental duty ratio Inc_du is a constant value set beforehand.

Then, in S540, the control circuit 60 subtracts the amount to limit the duty ratio L_du from the set duty ratio Set_du, thereby calculating the output duty ratio Out_du. The amount to limit the duty ratio L_du is a value calculated in the output limiting process. Then, the control circuit 60 generates a control command based on the output duty ratio Out_du and outputs the control command to the motor driver 42.

2-3. Effects

In the second embodiment detailed above, the above-described effects (3) through (6) of the first embodiment can be achieved, and furthermore, the following effects can be achieved.

(9) The second maximum limit is set. Upon the determination that the drive current value exceeds the limit threshold, the control circuit 60 calculates the amount to limit the duty ratio that is less than or equal to the second maximum limit, thereby correcting the output duty ratio based on the calculated amount to limit the duty ratio. Therefore, when the motor 50 momentarily receives a very large load, the control circuit 60 can inhibit the drive current and continue to drive the motor 50. Furthermore, when the motor 50 continuously receives a relatively large load, the control circuit 60 avoids the continuous inhibition of the drive current and can increase the drive current as necessary.

(10) The control circuit 60 integrates the second variation, thereby calculating the amount to limit the duty ratio. This allows the control circuit 60 to momentarily inhibit the drive current when the motor 50 momentarily receives a very large load. The control circuit 60 can increase the drive current as necessary when the motor 50 continuously receives a relatively large load.

3. Other Embodiments

Some embodiments of the present disclosure have been described; however, the present disclosure may be embodied in various forms without limited to the above-described embodiments.

(a) In the above described embodiments, the electric work machine 10 includes the two operation modes; however, the electric work machine 10 may include three or more operation modes. In the above described embodiments, the electric work machine 10 includes the two gear modes; however, the electric work machine 10 may include three or more gear modes. The operation modes may include an operation mode that does not set the first and/or second maximum limits, and the gear modes may include a gear mode that does not set the first and/or second maximum limit.

(b) In the above described embodiments, the control circuit 60 controls the motor 50 by the PWM control; however, the control circuit 60 may control the motor 50 by a method other than the PWM control. For example, the control circuit 60 may control the motor 50 by a pulse voltage amplitude modulation (PAM) control. Examples of control parameters controlling the motor 50 in the PAM control include an applied voltage applied to the motor 50. When the control circuit 60 controls the motor 50 by the PAM control, in place of the amount to limit the duty ratio L_du, an amount to limit the applied voltage may be calculated, and, in place of the second maximum limit L_du, a maximum limit of the amount to limit the applied voltage may be set. The control circuit 60 may calculate the amount to limit the applied voltage so as to be less than or equal to the set maximum limit of the amount to limit the applied voltage. Then, the control circuit 60 may calculate the value of the applied voltage based on the operation mode and/or the gear mode and/or the pulled distance of the trigger switch 21*a*, and may subtract the amount to limit the applied voltage from the calculated applied voltage.

(c) The electric work machine 10 is not limited to the driver drill. The electric work machine 10 may be any electric work machine if it includes a tool bit. For example, the electric work machine 10 may be an electric power tools such as reciprocating saws, jigsaws, and hammer drills, or gardening tools such as grass mowers.

(d) In place of or in addition to the microcomputer, the control circuit 60 may include a combination of individual various electronic components, and/or may include Application Specified Integrated Circuit (ASIC), Application Specific Standard Product (ASSP), a programmable logic device such as Field Programmable Gate Array (FPGA), and a combination thereof.

(e) A plurality of functions of one element of the aforementioned embodiments may be performed by a plurality of elements, and one function of one element may be performed by a plurality of elements. Furthermore, a plurality of functions of a plurality of elements may be performed by one element, and one function performed by a plurality of elements may be performed by one element. A part of the configurations of the aforementioned embodiments may be omitted. Furthermore, at least part of the configurations of the aforementioned embodiments may be added to or replaced with the configurations of the other above-described embodiments.

What is claimed is:

1. An electric work machine, comprising:

an output shaft (i) configured to be attached to a tool or (ii) connected to the tool;

a motor configured to drive the output shaft;

a trigger switch configured to be pulled by a user of the electric work machine to drive the motor;

a current measuring circuit configured to measure a current value, the current value corresponding to a magnitude of a drive current flowing through the motor; and a controller configured to:

set a maximum value of a correction value, the correction value being for correcting a target parameter used for driving the motor;

calculate the correction value less than or equal to the maximum value so that the drive current decreases, in response to the current value measured by the current measuring circuit having reached a threshold, the threshold being maintained at a preset fixed value while the trigger switch is being pulled;

subtract the correction value calculated from the target parameter, thereby correcting the target parameter; and drive the motor based on the target parameter corrected.

2. The electric work machine according to claim 1, further comprising a mode selector configured to be manually operated by the user to select a first mode or a second mode, wherein the controller is configured to (i) change the maximum value and (ii) drive the motor based on the first mode or the second mode selected by the user through the mode selector.

3. The electric work machine according to claim 2, wherein the mode selector is further configured to be manually operated by the user to select a third mode, and the controller is configured to allow the correction value to exceed the maximum value in response to the third mode being selected by the user through the mode selector.

4. The electric work machine according to claim 2, wherein the first mode is a drill mode to drill a hole in a workpiece, the second mode is a clutch mode to fasten a screw, the controller is configured to set a first value for the first mode, and set a second value distinct from the first value for the second mode, the first value is the maximum value corresponding to the drill mode, and the second value is the maximum value corresponding to the clutch mode.

5. The electric work machine according to claim 4, wherein the controller is configured to make the first value larger than the second value.

6. The electric work machine according to claim 4, wherein the controller is configured to set a third value for the first mode, and set a fourth value distinct from the third value for the second mode, the third value is the threshold corresponding to the drill mode, and the fourth value is the threshold corresponding to the clutch mode.

7. The electric work machine according to claim 6, wherein the controller is configured to make the third value smaller than the fourth value.

8. An electric work machine comprising:

an output shaft (i) configured to be attached to a tool or (ii) connected to the tool;

a motor configured to drive the output shaft;

a current measuring circuit configured to measure a current value, the current value corresponding to a magnitude of a drive current flowing through the motor;

two or more gears configured to transmit a rotation of the motor to the output shaft at a first deceleration ratio or a second deceleration ratio, the second deceleration ratio being larger than the first deceleration ratio;

a deceleration ratio setter configured to be manually operated by a user of the electric work machine, thereby setting the first deceleration ratio or the second deceleration ratio; and a controller configured to:

set a first maximum value of a correction value for the first deceleration ratio, and set a second maximum value of the correction value distinct from the first maximum value for the second deceleration ratio, the correction value being for correcting a target parameter used for driving the motor;

calculate the correction value less than or equal to the first maximum value or the second maximum value so that the drive current decreases, in response to the current value having reached a preset threshold;

subtract, from the target parameter, the correction value calculated, thereby correcting the target parameter; and drive the motor based on the target parameter corrected.

9. The electric work machine according to claim 8, wherein the controller is configured to:

calculate a variation based on a first difference and a first gain, and integrate the variation calculated, thereby calculating the correction value; and the first difference corresponds to a value obtained by subtracting the preset threshold from the current value measured by the current measuring circuit.

10. The electric work machine according to claim 8, wherein the target parameter includes a target rotational speed of the motor, a target voltage applied to the motor, or a target duty ratio of a pulse voltage applied to the motor.

11. The electric work machine according to claim 8, wherein the controller is configured to make the first maximum value larger than the second maximum value.

12. The electric work machine according to claim 8, wherein the controller is configured to set a first value for the first deceleration ratio, and set a second value distinct from the first value for the second deceleration ratio, the first value is the preset threshold corresponding to the first deceleration ratio, and the second value is the preset threshold corresponding to the second deceleration ratio.

13. The electric work machine according to claim 12, wherein the controller is configured to make the first value larger than the second value.

14. A method for controlling a motor of an electric work machine, the method comprising:

setting a deceleration ratio of two or more gears to a first deceleration ratio or a second deceleration ratio, the second deceleration ratio being larger than the first deceleration ratio, the two or more gears being configured to transmit a rotation of the motor to an output shaft at the first deceleration ratio or the second deceleration ratio, the output shaft being (i) configured to be attached to a tool or (ii) connected to the tool;

measuring a current value, the current value corresponding to a magnitude of a drive current flowing through the motor;

setting a first maximum value of a correction value for the first deceleration ratio, and setting a second maximum value of the correction value distinct from the first maximum value for the second deceleration ratio, the correction value being for correcting a target parameter used for driving the motor;

calculating the correction value less than or equal to the first maximum value or the second maximum value so that the drive current decreases, in response to the current value measured having reached a preset threshold;

subtracting the correction value calculated from the target parameter; and driving the motor based on the target parameter from which the correction value is subtracted.

* * * * *